United States Patent
Kobayashi et al.

(10) Patent No.: US 7,649,442 B2
(45) Date of Patent: Jan. 19, 2010

(54) APPARATUS AND METHOD FOR DETECTING VEHICLES BY IDENTIFYING LIGHT SPOTS FROM CAPTURED IMAGES

(75) Inventors: Kenji Kobayashi, Nogoya (JP); Hiroaki Kumon, Oobu (JP)

(73) Assignee: Denso Corporation, Kariya (JP)

( * ) Notice: Subject to any disclaimer, the term of this patent is extended or adjusted under 35 U.S.C. 154(b) by 336 days.

(21) Appl. No.: 11/899,386

(22) Filed: Sep. 5, 2007

(65) Prior Publication Data
US 2008/0062010 A1    Mar. 13, 2008

(30) Foreign Application Priority Data
Sep. 7, 2006    (JP)    ............................. 2006-243175

(51) Int. Cl.
*B60Q 1/00*    (2006.01)
(52) U.S. Cl. ................... 340/425.5; 340/469; 340/937; 362/465; 315/82
(58) Field of Classification Search .............. 340/425.5, 340/902, 933, 937, 942, 438, 439, 468, 469, 340/600, 602, 458; 362/464–469; 315/77, 315/82, 83; 701/1, 36
See application file for complete search history.

(56) References Cited

U.S. PATENT DOCUMENTS

| | | | | |
|---|---|---|---|---|
| 5,499,168 A | * | 3/1996 | Cochard et al. | ............. 362/466 |
| 6,861,809 B2 | * | 3/2005 | Stam | ........................... 315/82 |
| 7,157,856 B2 | * | 1/2007 | Chon et al. | ................... 315/82 |

FOREIGN PATENT DOCUMENTS

| | | |
|---|---|---|
| DE | 197 13 884 | 10/1998 |
| EP | 1 504 957 | 2/2005 |
| JP | 6-276524 | 9/1994 |

OTHER PUBLICATIONS

Office action dated Mar. 20, 2009 in German Application No. 10 2007 041 781.2.

* cited by examiner

*Primary Examiner*—Anh V La
(74) *Attorney, Agent, or Firm*—Harness, Dickey & Pierce, PLC

(57) ABSTRACT

A vehicle detection apparatus detects vehicles traveling on a road with their lights turned on. The apparatus captures images of a road, detects a light spot from captured images, and detects a first vertical coordinate of the light spot in the images. The apparatus further calculates a distance to the light spot based on a horizontal length of the light spot in the images and detects a second vertical coordinate corresponding to the calculated distance, based on correlated data in which vertical coordinates and distances in an image are correlated in advance. The apparatus further calculates a pitching amount that indicates a difference between the first and second coordinates and determines whether or not the light spot originates from a vehicle, based on the pitching amount.

18 Claims, 6 Drawing Sheets

APPARATUS AND METHOD FOR DETECTING VEHICLES BY IDENTIFYING LIGHT SPOTS FROM CAPTURED IMAGES

CROSS-REFERENCE TO RELATED APPLICATION

This application is based on and claims the benefit of priority from earlier Japanese Patent Application No. 2006-243175 filed Sep. 7, 2006, the description of which is incorporated herein by reference.

BACKGROUND OF THE INVENTION

1. Field of the Invention

The present invention relates to a vehicle detection apparatus for detecting vehicles traveling with their light turned on and to a light control apparatus utilizing the vehicle detection apparatus.

2. Description of the Related Art

Vehicle detection apparatuses have been known, which can detect vehicles traveling with their light turned on during the hours of darkness. This type of apparatuses include, for example, one which employs a technique for detecting headlamps or tail lamps of vehicles by processing images captured by a camera.

In processing a captured image, such a vehicle detection apparatus entails the necessity of preventing confusion between light spots originating from street lamps or neon signs, and light spots originating from vehicles. A technique for coping with this confusion is known as disclosed, for example, in Japanese Patent Application Laid-Open Publication No. 6-276524. According to this technique, if a pair of horizontally located bright regions (light spots) are detected first, and then if another bright region is detected below the pair of bright regions, the pair of bright regions is regarded as being a light spot originating from a vehicle.

However, the vehicle detection apparatus disclosed in the above literature raises a problem that light spots originating from street lamps or building neon signs could be regarded erroneously as being light spots originating from a preceding actual vehicle, when those lamps/signs are positioned in the captured images as if they are light spots from actual preceding vehicles. This results in erroneous detection of vehicles, if such a particular positional relationship between the street lamps or building neon signs and actual preceding vehicles happens in capturing forward images.

SUMMARY OF THE INVENTION

The present invention has been made in light of the problem presented above and has as its object to enable accurate discrimination between a light spot originating from a vehicle and a light spot originating from an object other than a vehicle and to enable accurate detection of vehicles.

In order to achieve the above object, a vehicle detection apparatus is provided as an aspect of the present invention. According to this vehicle detection apparatus, first coordinate detecting means detects a first coordinate indicating a vertical coordinate of a light spot that has been detected in a captured image by light spot detecting means, and second coordinate detecting means detects, based on correlated data, a second coordinate that indicates a vertical coordinate corresponding to a distance that has been calculated by distance calculating means.

Then, pitching amount calculating means calculates a pitching amount that indicates a difference between the first and the second coordinates in the captured image. Subsequently, vehicle light spot determining means determines whether or not the light spot in question originates from a vehicle, based on the calculated pitching amount.

In another example of the vehicle detection apparatus, first distance calculating means calculates a distance to a pair of light spots in a captured image, based on a spacing between the pair of light spots.

According to each of the vehicle detection apparatuses mentioned above, a distance to a light spot is calculated by the distance calculating means. Then, the light spot is determined as to whether it originates from a vehicle, based on a difference (pitching amount) between a vertical coordinate (first coordinate) of the light spot and a vertical coordinate (second coordinate) corresponding to the distance calculated by the distance calculating means. Thus, vehicles can be accurately detected.

The vehicle detection apparatuses mentioned above may be fixedly located on a road as an on-road facility, or may be loaded on a vehicle. The vehicle light spot determining means may be configured to determine a light spot as originating from a vehicle when a calculated pitching amount falls within a predetermined range, for example.

The advantages of the present invention other than those mentioned above will become apparent from the brief description of the drawings and the description of the preferred embodiments provided below.

DETAILED DESCRIPTION OF PREFERRED EMBODIMENTS

Hereinafter are described some embodiments of the present invention, referring to the accompanying drawings.

First Embodiment

Figure 1A:
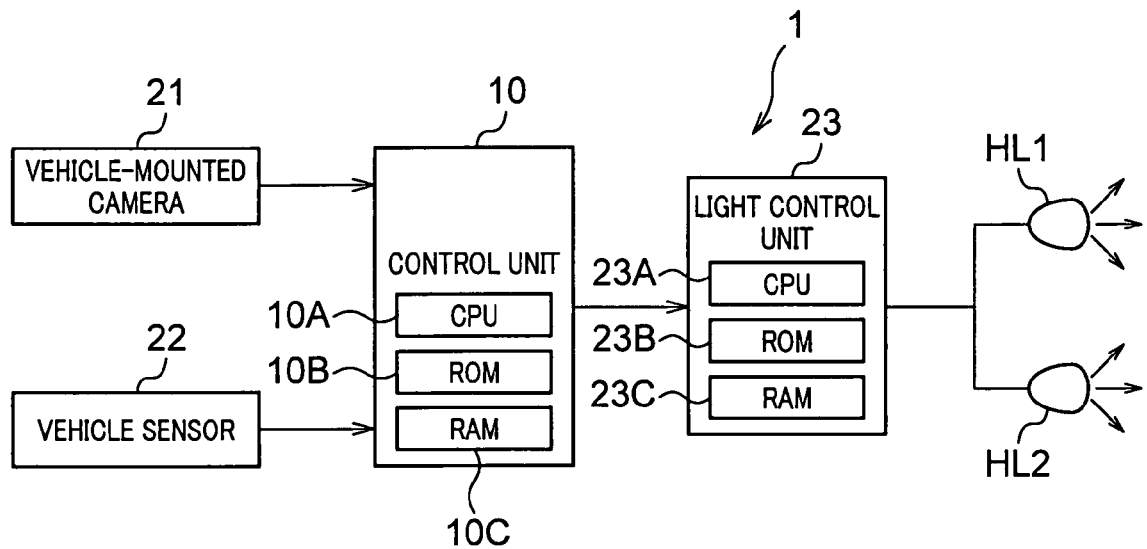
FIG. 1A is a schematic block diagram illustrating a light control apparatus.

FIG. 1A is a schematic block diagram illustrating a light control apparatus 1 to which a vehicle detection apparatus of the present invention is applied.

The light control apparatus 1 is loaded on a vehicle, such as a passenger car. The light control apparatus 1 detects vehicles traveling ahead in the same direction and vehicles coming from the opposite direction, and carries out processes for switching the headlamps between low and high beams according to the results of the detection.

In particular, as shown in FIG. 1A, the light control apparatus 1 includes a control unit 10, a vehicle-mounted camera 21, a vehicle sensor 22 and a light control unit 23.

The vehicle-mounted camera 21 is located at the front of the vehicle to capture images in a forward direction during the hours of darkness (e.g., when the surrounding is so dark as to need use of headlamps, such as at night, in a mist and in the middle of a tunnel) and to transmit captured images to the control unit 10. The vehicle-mounted camera 21 is adapted to transmit ten captured images (frames) per second to the control unit 10.

The vehicle sensor 22 is configured to serve as a sensor, such as a speed sensor or a luminance sensor. The vehicle sensor is connected to the control unit 10, so that the results of detection made by the vehicle sensor 22 can be received by the control unit 10.

The control unit 10 is configured to serve as a known microcomputer provided, for example, with a CPU 10A, an ROM 10B and an RAM 10C (serving as memory means). Based on software programs given in advance, the control unit 10 (i.e., the CPU 10A) executes various processes, including a nighttime vehicle detection process (process as a vehicle detection apparatus as referred to in the present invention) that will be described later, according to the programs stored in the ROM. Then, the control unit 10 transmits results of vehicle recognition, i.e. the information on a vehicle resulting from the processes, to the light control unit 23 which is connected to the control unit 10 through an on-vehicle LAN or the like.

The light control unit 23 is configured to serve as a known microcomputer provided, for example, with a CPU 23A, an ROM 23B and an RAM 23C and switches the headlamps HL1 and HL2 between low and high beams, based on the results of vehicle recognition received from the control unit 10. In particular, upon reception of the information from the control unit 10 that a vehicle (traveling ahead or the opposite lane) has been detected, the light control unit 23 (i.e., the CPU 23A) activates a previously given software program to switch the headlamps to a low beam, so that a driver of the vehicle traveling ahead or the opposite lane would not be dazzled by the headlamps.

Further, upon reception of the information from the control unit 10 that a vehicle has not been detected, the light control unit 23 switches the headlamps to a high beam, so that a driver of the subject vehicle can attain a visual range as far as possible.

Figure 1B:
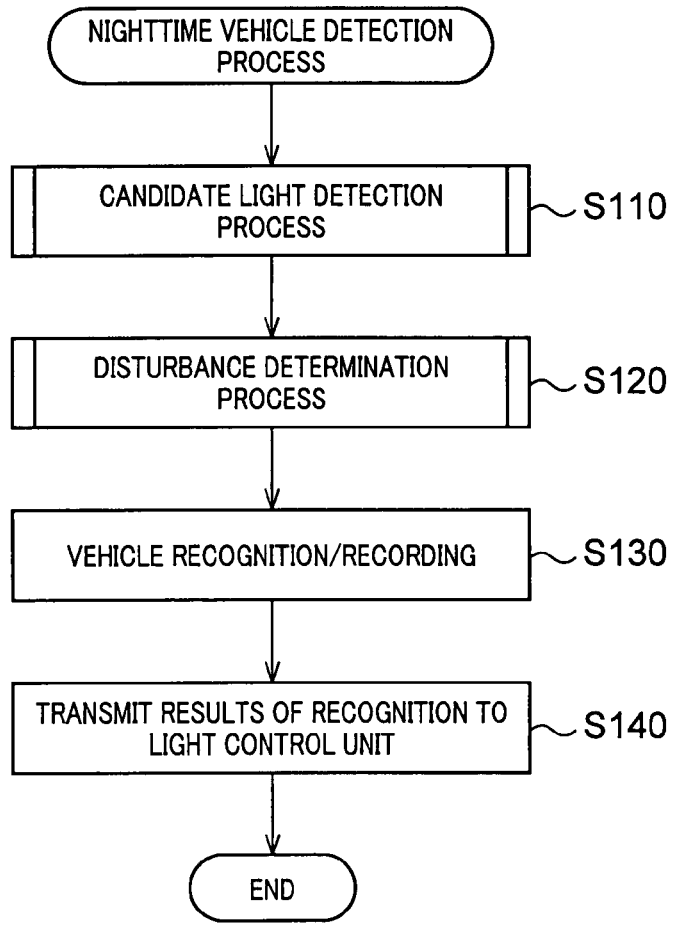
FIG. 1B is a flow diagram illustrating a nighttime vehicle detection process executed by a control unit.

Referring now to FIG. 1B, an explanation will be provided on a process conducted by the control unit 10 in detecting a vehicle traveling ahead or a vehicle traveling from the opposite direction by using the vehicle-mounted camera 21. FIG. 1B is a flow diagram illustrating the nighttime vehicle detection process conducted by the control unit 10.

The nighttime vehicle detection process is a process repeatedly initiated, for example, every time (every 100 ms in the present embodiment) a captured image is received from the vehicle-mounted camera 21 under the conditions where the vehicle sensor 22 (luminance sensor, in particular) has detected that the luminance around the vehicle is equal to or less than a predetermined. It should be appreciated that the configuration may be such that this process is repeatedly initiated when the headlamps are in an on-state.

Figure 2:
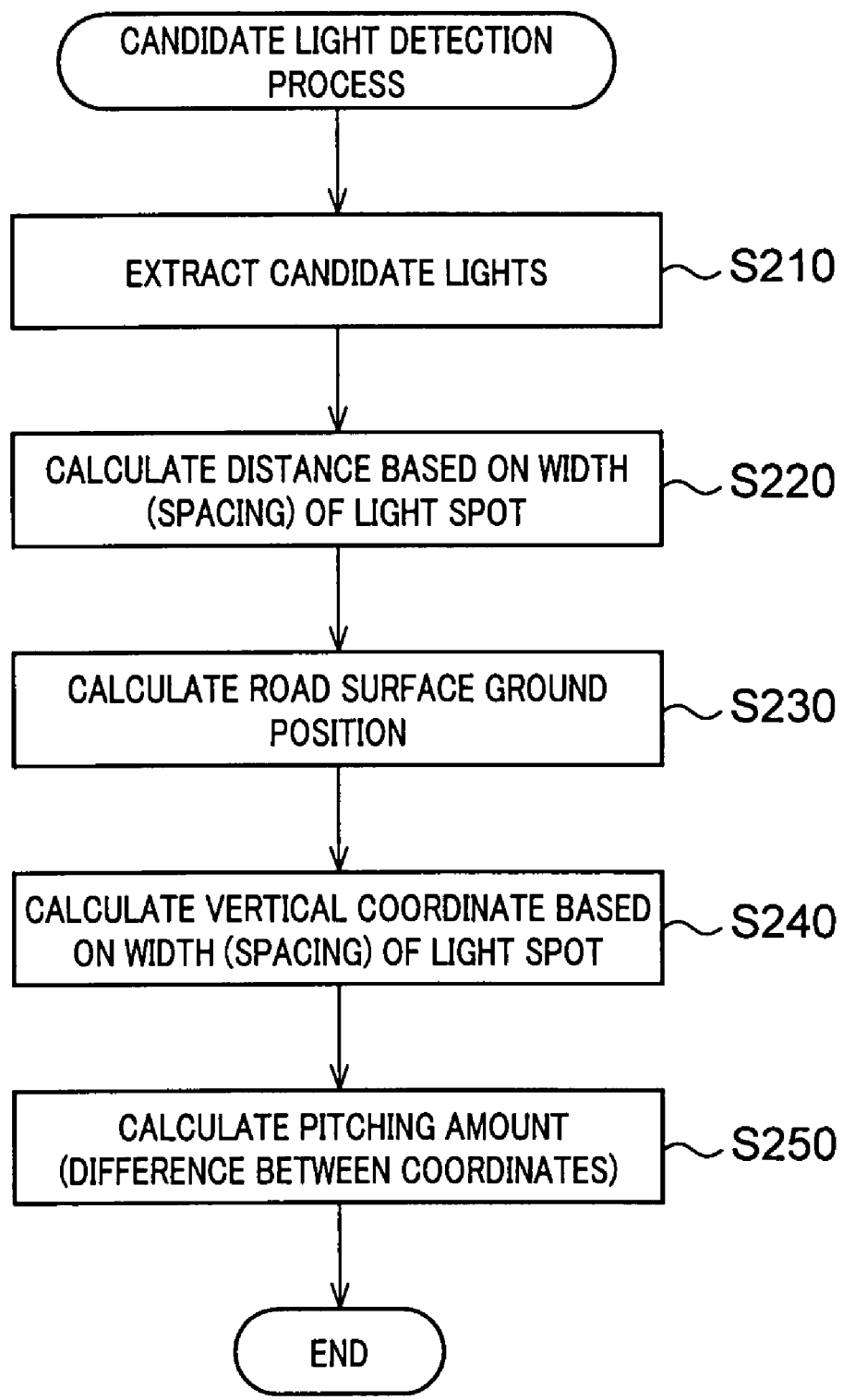
FIG. 2 is a flow diagram illustrating a candidate light detection process performed in the nighttime vehicle detection process, according to a first embodiment of the present invention.
Figure 3A:
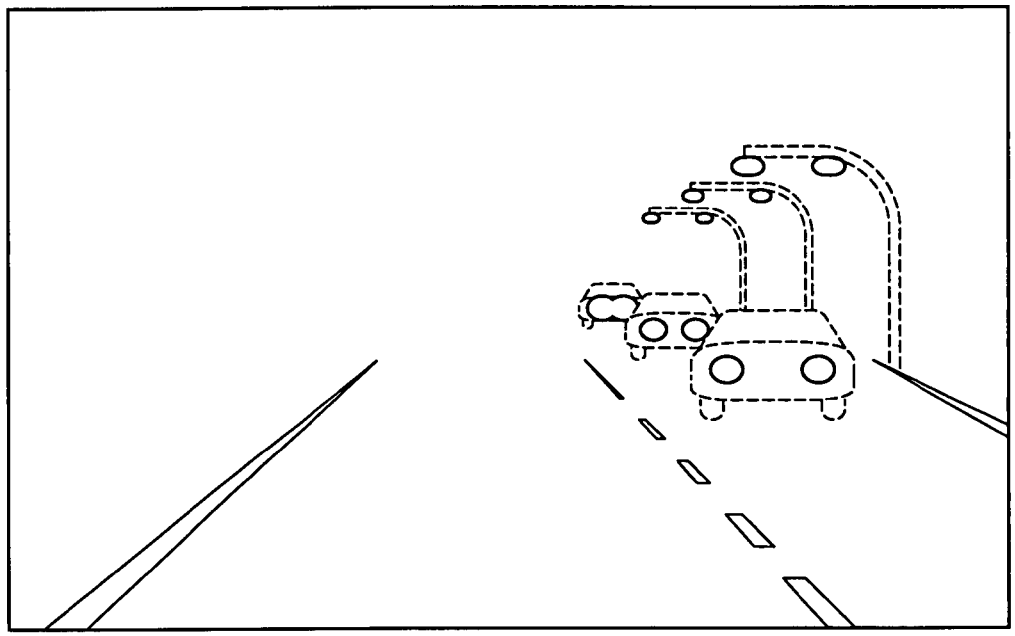
FIGS. 3A and 3B are explanatory views illustrating a process for extracting a light spot from a captured image.
Figure 3B:
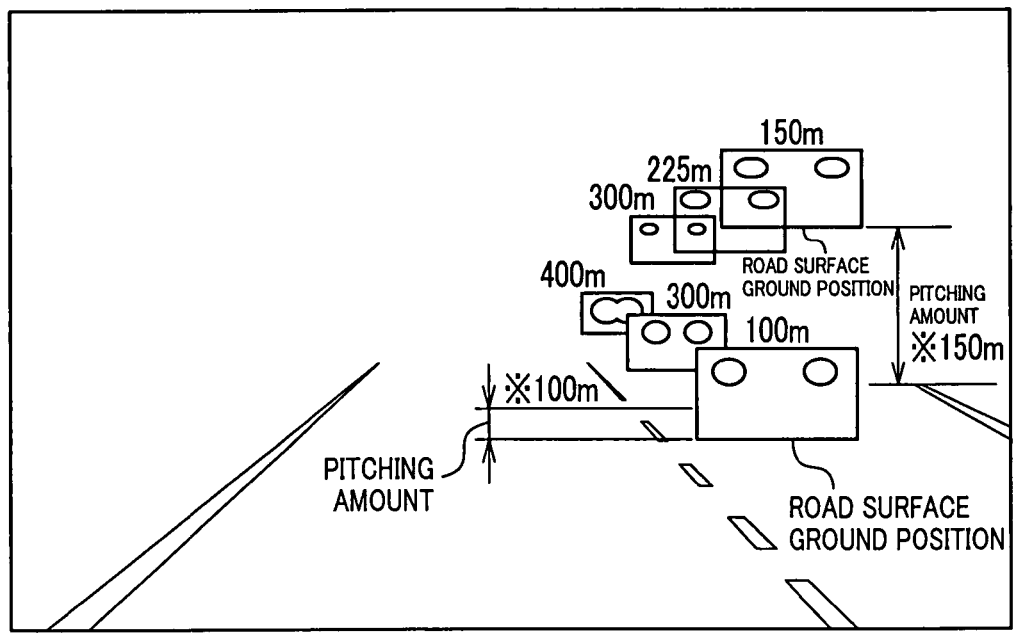
Figure 4A:
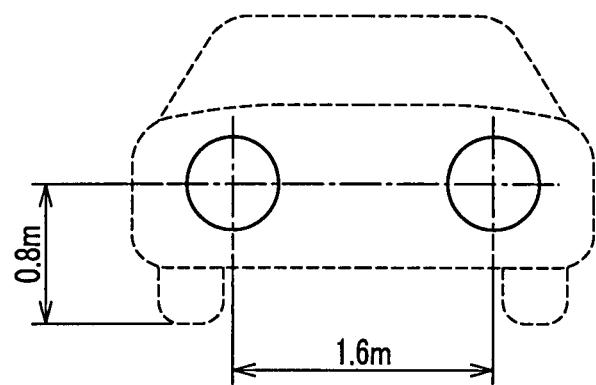
FIGS. 4A to 4C are explanatory views illustrating a process for detecting a ground position from a light spot.
Figure 4B:
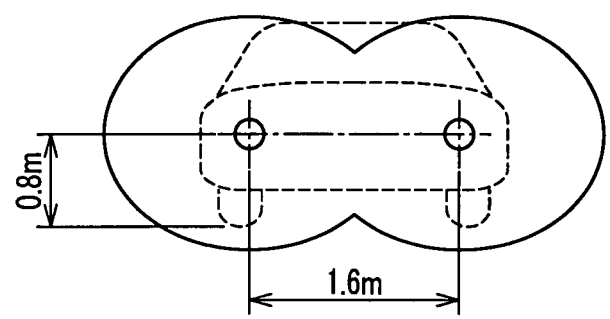
Figure 4C:
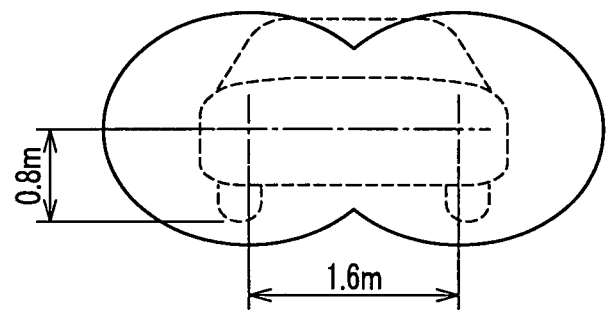

In the nighttime vehicle detection process, a candidate light detection process is executed to detect candidate lights from an image captured by the vehicle-mounted camera 21 (step S110). Referring to FIGS. 2 to 4C, the candidate light detection process will now be described in detail. FIG. 2 is a flow diagram illustrating the candidate light detection process performed in the nighttime vehicle detection process. FIGS. 3A and 3B are explanatory views illustrating a process for extracting light spots from a captured image. FIGS. 4A to 4C are explanatory views illustrating a process for detecting a ground position from a light spot.

In the candidate light detection process, light spots as candidate lights are extracted, first, from the image captured by the vehicle-mounted camera 21 (step S210 associated with light spot detecting means and first coordinate detecting means).

In particular, in the image shown in FIG. 3A, pixels constituting the image are binarized based on a threshold level of a predetermined luminance to extract bright (high-intensity) areas. Then, bright portions, such as white lines, are removed according to the locations and shapes of the extracted bright areas. Thus, a coordinate (first coordinate) for each horizontally located pair of light spots or each normal light spot (single light spot not paired) is extracted.

It should be appreciated that, hereinafter, any use of the term "a light spot" or "each light spot" or "the light spot" may refer to a single light spot, a pair of light spots and a plurality of light spots. Similarly, any use of the term "a candidate light" or "each candidate light" or "the candidate light" may refer to a single candidate light, a pair of candidate lights and a plurality of candidate lights.

Subsequently, a distance to each light spot is calculated based on a length of each light spot (step S220 associated with (first) distance calculating means). In particular, this process employs a scheme of univocally determining a distance to a light spot according to the number of pixels which occupy a spacing of a pair of light spots or a width of a single light spot in the captured image.

Then, as shown in FIG. 3B, calculation is performed based on a spacing of the extracted pair of light spots or a width of the extracted light spot to find a vertical coordinate (ground position coordinate) of a road surface ground position in the captured image, assuming that the extracted light spot originates from a vehicle (step S230 associated with road surface ground position estimating means).

As shown in FIG. 4A, if the extracted light spot in this process is a pair of light spots, the length between the centers of the two light spots is regarded as being a predetermined light spacing (e.g., 1.6 m), and multiplied by a predetermined coefficient (e.g., 0.5) to obtain a length (0.8 m in this example). A position shifted downward by this length (0.8 m) from the center level of the two light spots is regarded as the road surface ground position.

In this connection, if, for example, a vehicle to be detected is located far away or when mist rises over, a plurality of lights of a vehicle to be detected may be extracted as a single light spot. The present embodiment is configured to detect well vehicles even under such circumstances.

As shown in FIG. 4B, if the extracted light spot is not a pair of light spots but a single light spot with two brighter areas residing within the light spot, these two brighter areas are regarded as being positioned at the center level of the light spot for calculation of the road surface ground position. It should be appreciated that the brighter areas within the light spot can be detected by using a threshold level having higher luminance than that mentioned above.

Further, as shown in FIG. 4C, if the extracted light spot is a single light spot with no brighter areas being detected therein, the width (horizontal length) of this light spot is multiplied by a predetermined coefficient (e.g., 0.7). The result of the multiplication is regarded as being the light spacing for calculation of the road surface ground position.

Subsequently, a calculation is performed to find a vertical (direction perpendicular to a horizontal direction) coordinate in the captured image, corresponding to the distance that has been detected based on the width or the spacing of the light spot (step S240 associated with second coordinate detecting means). Specifically, correlated data, in which the vertical coordinates in the captured image are correlated to distances, is stored in advance in a memory, such as an ROM. With reference to the correlation data, the vertical coordinate (second coordinate) corresponding to the calculated distance is calculated.

Then, a pitching amount is calculated (step S250 associated with the pitching amount calculating means). The term "pitching amount" is an angular amount indicative of changes in the angle between the road and a camera viewing direction, which changes are due to vehicle pitching motions. Thus this pitching amount can be expressed, for example, by a difference between the vertical coordinate of the road surface ground position calculated at step S230 and the vertical coordinate calculated at step S240.

As shown in FIG. 3B, where detection is performed for a light spot originating from a vehicle, the pitching amount is comparatively small. Contrarily, where detection is performed for a light spot originating from an object other than vehicles (e.g., street lamp), the pitching amount is comparatively large.

When the candidate light detection process (step S110) is over, a disturbance determination process is performed (step S120). The disturbance determination process, which will be described in detail later, is purposed to remove the candidate lights not originating from vehicles from the candidate lights detected at step S110. Accordingly, after completing the disturbance determination process, there remain only the candidate lights originating from vehicles (light spots originating from vehicles).

When the disturbance determination process is over, each of the remnant candidate lights is recognized as being the light spot originating from a vehicle. Then, the position and the pitching amount of each light spot originating from a vehicle are recorded in a memory, such as an RAM (step S130 associated with storing means). The results of recognition are then transmitted to the light control unit 23 (step S140) to put an end to the nighttime vehicle detection process.

Figure 5A:
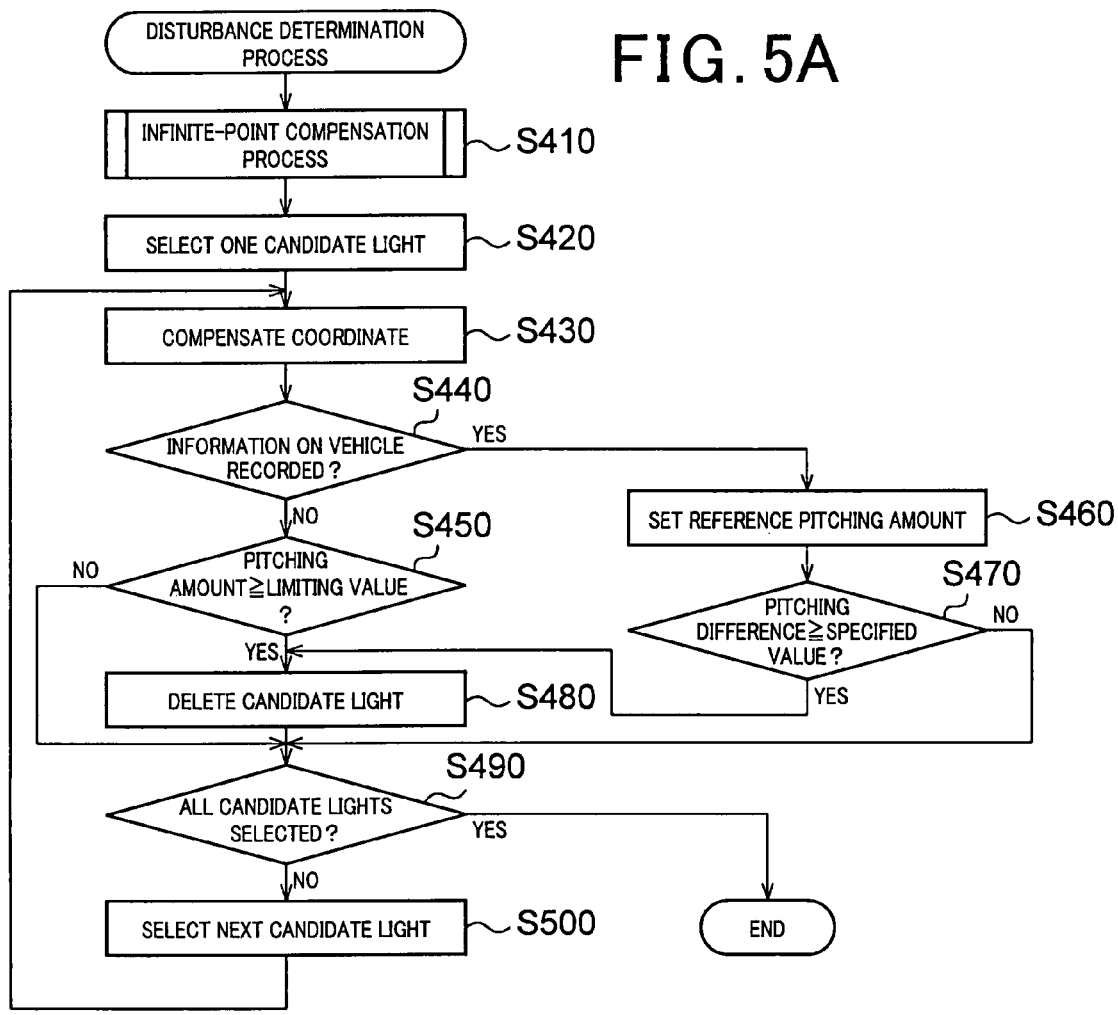
FIG. 5A is a flow diagram illustrating a disturbance determination process.
Figure 5B:
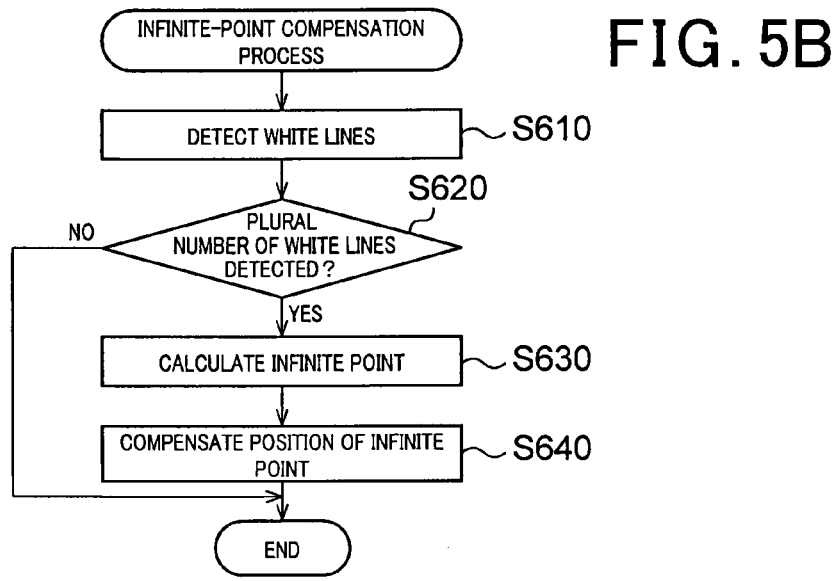
FIG. 5B is a flow diagram illustrating an infinite-point compensation process performed in the disturbance determination process.

With reference to FIGS. 5A and 5B, hereinafter is described in detail the disturbance determination process (step S120). FIG. 5A is a flow diagram illustrating the disturbance determination process, and FIG. 5B is a flow diagram illustrating an infinite-point compensation process performed in the disturbance determination process. The disturbance determination process executes, first, the infinite-point compensation process (step S410).

In the infinite-point compensation process, white lines parallel to the traveling direction of the vehicle (direction extending along the road) are detected from the image captured by the vehicle-mounted camera 21 (step S610 associated with white-line detecting means). In the example shown in FIG. 6A, there exist a white line (left-side solid line) extending between the driving lane and the shoulder of the road, and a white line (right-side broken line) extending along the boundary between the driving lane and the oncoming lane. Thus, these white lines are detected in the example shown in FIG. 6A. The process for detecting white lines from a captured image is well known as disclosed, for example, in Japanese Patent Application Laid-Open Publication No. 2005-157670. An explanation of this process therefore is omitted here.

Subsequently, it is determined whether or not a plural number of white lines have been detected at step S610. If no plural number of white lines has been detected ("NO" at step S620), the infinite-point compensation process is ended because detecting an infinite point (position of a virtual horizon) in this process is not possible. If a plural number of white lines have been detected ("YES" at step S620), these plural number of lines are extended in the captured image to calculate a virtual intersection of these plural number of white lines (step S630 associated with infinite-point detecting means). Then, the intersection is compensated to obtain a correct infinite point (step S640).

Figure 6A:
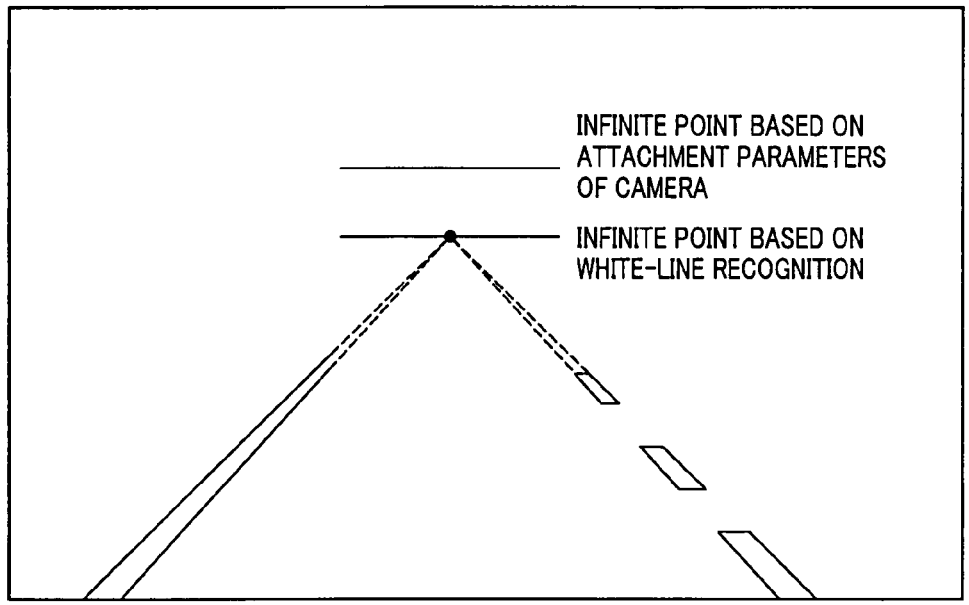
FIG. 6A is an explanatory view illustrating a specific example for compensating an infinite-point.

FIG. 6A shows a specific example of the processing at S640, in which an infinite point set in advance based on attachment parameters (elements, such as position and angle of attachment) of the vehicle-mounted camera 21 is compensated so as to stand as the infinite point calculated in the white-line recognition (infinite-point compensation process).

When the processing at S640 is finished, the infinite-point compensation process is ended and control returns to the disturbance determination process (FIG. 5A). Subsequently, one of the candidate lights detected at step S110 is selected (step S420).

Then, the correlated data correlating the vertical coordinates in the captured image to distances is compensated based on the infinite point set in the course of the infinite-point compensation process. Along with the compensation of the correlated data, the coordinate of the road surface ground position and the pitching amount are compensated (step S430 associated with coordinate compensating means). After that, it is determined as to whether or not information on a vehicle (detected vehicle) in the previous frame is recorded in the memory, such as an RAM (step S440).

If no information on the vehicle in the previous frame is recorded ("NO" at step S440), a determination is made as to whether or not the pitching amount in the selected candidate light is less than a preset limiting value (step S450 associated with vehicle light spot determining means). It should be appreciated that the limiting value is set at a value in consideration of the fact that the position of the infinite point varies depending, for example, on the vibration of the vehicle and the inclination of the road.

If the pitching amount is equal to or more than the limiting value ("NO" at step S450), this candidate light is deleted as not being the light spot originating from a vehicle (step S480), and control proceeds to step S490. If the pitching amount is less than the limiting value ("YES" at step S450), the candidate light is regarded as originating from a vehicle and will not be deleted. Then, control proceeds to step S490.

On the other hand, if the information on a vehicle in the previous frame has been recorded in the memory, such as an RAM, ("YES" at step S440), the recorded pitching amount of the vehicle is set as a reference pitching amount (step S460 associated with reference pitching amount setting means). It is determined then whether or not the difference (pitch difference) between the pitching amount in the candidate light and the reference pitching amount is less than a predetermined specified value (step S470 associated with vehicle light spot determining means). It should be appreciated that the specified value is set in consideration of the vibration of a vehicle and the fact that the recorded vehicle moves.

If the pitch difference is equal to or more than the specified value ("YES" at step S470), the candidate light is deleted as not originating from a vehicle (step S480), and control proceeds to step S490. If the pitch difference is less than the specified value ("NO" at step 470), the candidate light is regarded as originating from a vehicle and will not be deleted. Then, control proceeds to step S490.

At step S490, a determination is made as to whether or not all the detected candidate lights have been selected (step S490). If any one of the candidate lights has not been selected ("NO" at step S490), the next candidate light is selected (step S500), and control returns to step S430. If all the candidate lights have been selected ("YES" at step 490), the disturbance determination process is ended.

In the light control apparatus 1 described above, the control unit 10 first detects light spots from a captured image in the candidate light compensation process and detects the first coordinate that indicates a vertical coordinate for each detected light spot. Then, the control unit 10 calculates a distance from the subject vehicle to each light spot, based on the width or the spacing of the light spot, followed by detecting the second coordinate that indicates a vertical coordinate corresponding to the calculated distance, based on the preset correlated data.

Further, taking into account of the possibility that the light spot originates from a vehicle, the control unit 10 estimates a ground coordinate representing the coordinate of a road surface ground position of the vehicle, based on the horizontal length of the light spot or the spacing between a pair of light spots constituting the light spot as well as on the first coordinate. Then, the control unit 10 calculates the pitching amount that indicates a difference between the ground coordinate and the second coordinate in a captured image, and determines whether or not the light spot originates from a vehicle, based on the calculated pitching amount.

Thus, the light control apparatus 1 configured in this way calculates a distance to a light spot, and then determines whether or not the light spot originates from a vehicle, based on the difference (pitching amount) between the vertical coordinate (ground coordinate) of the road surface ground position of the light spot and the vertical coordinate (second coordinate) corresponding to the calculated distance. Thus, vehicles can be accurately detected.

The light control apparatus 1 calculates a distance to a light spot in the candidate light detection process, taking into account of a ground position of a vehicle in case the light spot originates from a vehicle. Thus, the accuracy of the coordinate calculation can be enhanced to thereby enable accurate determination as to whether or not the light spot originates from a vehicle.

If the light spot is determined as originating from a vehicle, the control unit 10 of the light control apparatus 1 stores the position and the pitching amount of the vehicle into the RAM of the control unit 10, and then sets a reference pitching amount based on the stored position and pitching amount of the vehicle. Then, when a subsequently calculated pitching amount falls within a predetermined specified range that has been set based on the reference pitching amount, the control unit 10 determines that the light spot originates from a vehicle.

In this way, the light control apparatus 1 utilizes the previously detected vehicle information (position and pitching amount) so as to detect whether or not the subsequently detected light spot originates from a vehicle, thereby enhancing high-accuracy detection of vehicles.

Further, the light control apparatus 1 detects an infinite point of a road in a captured image by detecting an intersection of a plural number of white lines which are parallel to a direction in which the road extends, and then compensates the second coordinate based on the position of the infinite point.

Accordingly, the light control apparatus 1 can compensate the second coordinate based on the position of the infinite point even when a relation between a vertical position and a distance to a light spot in captured images is significantly different from the actual distance to the light spot depending, for example, of the vibration of the vehicle or the inclination of the road. Thus, the distance to the light spot can be accurately detected to thereby accurately detect whether or not the light spot originates from a vehicle.

The light control unit 23 of the light control apparatus 1 switches the headlamps to a low beam when a vehicle is detected by the vehicle detecting means, and switches the headlamps to a high beam when no vehicle is detected by the vehicle detecting means.

Thus, the light control apparatus 1 can more accurately detect vehicles using the nighttime vehicle detection process, and thus can well control the headlamps between high and low beams based on the results of detection on vehicles.

Second Embodiment

Hereinafter is described a light control apparatus 2 according to a second embodiment of the present invention. In the second embodiment, a detailed description will be provided only for the components which are different from those of the light control apparatus 1 in the first embodiment. Also, in the present embodiment, the identical or similar components to those in the first embodiment are given the same reference numerals for the sake of omitting explanation.

In the light control apparatus 2, the nighttime vehicle detection process is partly different from that of the light control apparatus 1 in the first embodiment.

Figure 6B:
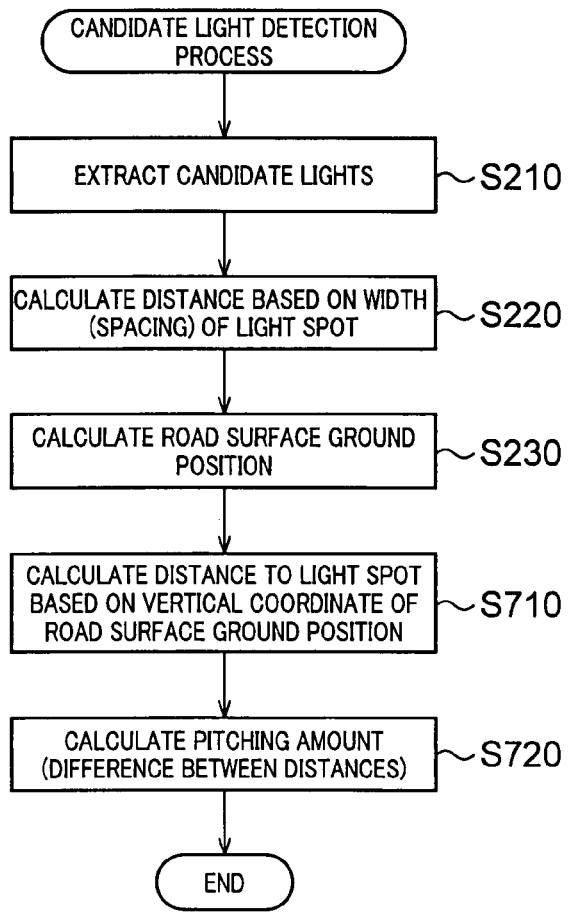
FIG. 6B is a flow diagram illustrating a candidate light detection process performed in a nighttime vehicle detection process, according to a second embodiment of the present invention.

For example, a procedure as shown in FIG. 6B is carried out in the candidate light detection process. Specifically, the same steps as shown in FIG. 2 are taken up to step S230. After finishing the processing at step S230, a distance to a light spot is calculated based on a vertical coordinate of the road surface ground position (step S710 associated with second distance calculating means). Then, a difference between the distance to the light spot calculated at step S220 and the distance to the light spot calculated at step S710 is calculated as a pitching amount (step S720).

In the light control apparatus 1 according to the first embodiment, the "pitching amount" has been defined as being a difference between the vertical coordinate of the road surface position calculated at step S230 and the vertical coordinate calculated at step S240. However, in the light control apparatus 2 according to the second embodiment, the "pitching amount" is defined as being a difference between the distances calculated by using the two schemes.

In this case, the processing at step S430 of the disturbance determination process may be the compensation of the distance to the light spot that has been calculated at step S710 based on the coordinate of an infinite point.

In the light control apparatus 2, a distance to a light spot is calculated based on a horizontal length of the light spot or a spacing between a pair of light spots constituting the light spot in a captured image. In addition, a distance to the light spot is calculated based on a vertical coordinate of the light spot (road surface ground position) in the captured image. Then, based on a pitching amount indicating a difference between these distances, it is determined whether or not the light spot originates from a vehicle.

Thus, the light control apparatus 2 calculates distances to a light spot by using a plurality of schemes to determine whether or not the light spot originates from a vehicle, based on the difference (pitching amount) between the distances. Therefore, vehicles can be detected with accuracy as in the light control apparatus 1 according to the first embodiment.

Further, the light control apparatus 2 calculates a distance to a light spot in the candidate light detection process, taking into account of a ground position of a vehicle in case the light spot originates from a vehicle. Thus, the accuracy in the distance measurement can be enhanced to thereby enable accurate determination as to whether or not the light spot originates from a vehicle.

The light control apparatus 2 detects an infinite point of a road in a captured image by detecting an intersection of a plural number of white lines, which are parallel to a direction in which the road extends, and then compensates the distance to the light spot based on the position of the infinite point (which is associated with distance compensating means).

Accordingly, the light control apparatus 2 can compensate the distance to the light spot calculated at step S710 based on the position of the infinite point even when a relation between a vertical position and a distance to a light spot in captured images is significantly different from the actual distance to the light spot depending, for example, of the vibration of the vehicle or the inclination of the road. Thus, the distance to the light spot can be accurately detected to thereby accurately detect whether or not the light spot originates from a vehicle.

Other Embodiments

The present invention is not limited to the embodiments described above, but can be implemented in various modes as far as the implementation falls within the technical scope of the present invention.

For example, alternative to the configuration, in which the light control apparatus 1 or 2 is loaded on a vehicle as described in the above embodiments, the light control unit 23 may be removed from the configuration for utilization as a vehicle detection apparatus. In this case, the apparatus may be fixedly located on a road as an on-road facility.

In the above embodiments, the calculation of a distance to a light spot has involved detection of a road surface ground position and the results of the detection have been utilized. Alternatively, the distance to the light spot may be directly calculated from a vertical coordinate of the light spot without detecting the road surface ground position.

In the above embodiments, in setting a reference pitching amount at step S460, the same reference pitching amount has been set irrespective of a distance to a light spot. Alternatively, a different reference pitching amount may be set according to a distance to a light spot. In particular, correlated data may be prepared in advance, so that a reference pitching amount can be determined based on the vehicle information (distance to the vehicle and pitching amount) recorded on the previous time frame and the subsequently detected distance to the light spot, by referring to the correlated data.

This may enable more accurate determination as to whether or not a light spot originates from a vehicle because a reference pitching amount can be set according to a distance to the light spot.

The advantages that can be obtained from the embodiments described above can be summed up as follows with respect to the present invention.

The vehicle detection apparatus of the present invention calculates a distance to a light spot by using the distance calculating means, and then determines whether or not the light spot originates from a vehicle, based on a difference (pitching amount) between a vertical coordinate (first coordinate) of the light spot and a vertical coordinate (second coordinate) corresponding to the distance calculated by the distance calculating means. Thus, vehicles can be accurately detected.

The vehicle detection apparatus of the present invention allows the second coordinate detecting means to calculate a distance to a light spot, taking into account of a ground position of a vehicle in case the light spot originates from a vehicle. Therefore, accuracy in the coordinate calculation performed by the second coordinate detecting means can be enhanced. Accordingly, high accuracy can also be ensured in the determination as to whether or not the light spot originates from a vehicle.

The vehicle detection apparatus of the present invention utilizes the information on a previously detected vehicle (position and pitching amount) in determining the subsequently detected light spot as to whether or not it originates from a vehicle. Thus, accuracy in the detection of vehicles can be more enhanced.

The vehicle detection apparatus of the present invention can compensate the second coordinate based on the position of the infinite point even when a relation between a vertical position and a distance to a light spot in captured images is significantly different from the actual distance to the light spot depending, for example, on the vibration of the vehicle or the inclination of the road. Thus, the distance to the light spot can be accurately detected to thereby accurately detect whether or not the light spot originates from a vehicle.

The vehicle detection apparatus of the present invention calculates a plurality of distances to a light spot using a plurality of schemes, and then determines whether or not the light spot originates from a vehicle based on a difference (pitching amount) between the distances. Thus, vehicles can be accurately detected.

The light control apparatus in each of the present embodiments is able to perform accurate detection of vehicles owing to the provision of the vehicle detection apparatus described above, so that the headlamps can be well controlled between high and low beams based on the results of the detection.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A vehicle detection apparatus for detecting vehicles traveling on a road with their lights turned on, comprising:
   an image capturing block that captures images of a road;
   a light spot detecting block that detects a light spot from an image captured by the image capturing block;
   a first coordinate detecting block that detects a first coordinate that indicates a vertical coordinate of the light spot in the captured image;
   a distance calculating block that calculates a distance to the light spot based on a horizontal length of the light spot in the captured image;
   a second coordinate detecting block that detects a second coordinate that indicates a vertical coordinate corresponding to the distance calculated by the distance calculating block, based on correlated data in which vertical coordinates and distances in a captured image are correlated to each other in advance;

a pitching amount calculating block that calculates a pitching amount that indicates a difference between the first coordinate and the second coordinate in the captured image; and a vehicle light spot determining block that determines whether or not the light spot originates from a light spot of a vehicle, based on the pitching amount.

2. The vehicle detection apparatus according to claim 1, wherein the light spot detecting block detects a pair of horizontally located light spots as the light spot;

the distance calculating block calculates a distance to the pair of light spots constituting the light spot in the captured image, based on a spacing between the pair of light spots; and the vehicle light spot determining block determines whether or not the pair of light spots originates from a vehicle, based on the pitching amount.

3. The vehicle detection apparatus according to claim 1, further comprising:

a ground position estimating block that estimates a ground coordinate that indicates a coordinate of a road surface ground position of a vehicle, when a light spot is assumed to originate from the vehicle, based on the horizontal length of the light spot or the spacing between a pair of light spots constituting the of light spot, which light spot is detected by the light spot detecting block, and based on the first coordinate, wherein the pitching amount calculating block calculates, as the pitching amount, a difference in vertical direction between the ground coordinate and the second coordinate.

4. The vehicle detection apparatus according to claim 1, further comprising:

a storage that stores a position and a pitching amount of a vehicle into memory means in case the light spot has been determined by the vehicle light spot determining block as originating from the vehicle; and a reference pitching amount setting block that sets a reference pitching amount based on the position and the pitching amount stored in the storage, wherein the vehicle light spot determining block determines the light spot as originating from a vehicle in case the pitching amount calculated by the pitching amount calculating block falls within a predetermined specified range set in advance based on the reference pitching amount which is set by the reference pitching amount setting block.

5. The vehicle detection apparatus according to claim 1, comprising:

a white-line detecting block that detects a plural number of white lines on a road, which white lines are parallel to a direction in which the road extends in the captured image;

an infinite-point detecting block that detects a position of an infinite point in the captured image by detecting an intersection of the plural number of white lines in the captured image; and a coordinate compensating block that compensates the second coordinate based the position of the infinite point.

6. The vehicle detection apparatus according to claim 2, further comprising:

a ground position estimating block that estimates a ground coordinate that indicates a coordinate of a road surface ground position of a vehicle, when a light spot is assumed to originate from the vehicle, based on the horizontal length of the light spot or the spacing between a pair of light spots constituting the of light spot, which light spot is detected by the light spot detecting block, and based on the first coordinate, wherein the pitching amount calculating block calculates, as the pitching amount, a difference in vertical direction between the ground coordinate and the second coordinate.

7. The vehicle detection apparatus according to claim 2, further comprising:

a storage that stores a position and a pitching amount of a vehicle into memory means in case the light spot has been determined by the vehicle light spot determining block as originating from the vehicle; and a reference pitching amount setting block that sets a reference pitching amount based on the position and the pitching amount stored in the storage, wherein the vehicle light spot determining block determines the light spot as originating from a vehicle in case the pitching amount calculated by the pitching amount calculating block falls within a predetermined specified range set in advance based on the reference pitching amount which is set by the reference pitching amount setting block.

8. The vehicle detection apparatus according to claim 2, comprising:

a white-line detecting block that detects a plural number of white lines on a road, which white lines are parallel to a direction in which the road extends in the captured image;

an infinite-point detecting block that detects a position of an infinite point in the captured image by detecting an intersection of the plural number of white lines in the captured image; and a coordinate compensating block that compensates the second coordinate based the position of the infinite point.

9. The vehicle detection apparatus according to claim 3, further comprising:

a storage that stores a position and a pitching amount of a vehicle into memory means in case the light spot has been determined by the vehicle light spot determining block as originating from the vehicle; and a reference pitching amount setting block that sets a reference pitching amount based on the position and the pitching amount stored in the storage, wherein the vehicle light spot determining block determines the light spot as originating from a vehicle in case the pitching amount calculated by the pitching amount calculating block falls within a predetermined specified range set in advance based on the reference pitching amount which is set by the reference pitching amount setting block.

10. The vehicle detection apparatus according to claim 3, comprising:

a white-line detecting block that detects a plural number of white lines on a road, which white lines are parallel to a direction in which the road extends in the captured image;

an infinite-point detecting block that detects a position of an infinite point in the captured image by detecting an intersection of the plural number of white lines in the captured image; and a coordinate compensating block that compensates the second coordinate based the position of the infinite point.

11. The vehicle detection apparatus according to claim 4, comprising:
- a white-line detecting block that detects a plural number of white lines on a road, which white lines are parallel to a direction in which the road extends in the captured image;
- an infinite-point detecting block that detects a position of an infinite point in the captured image by detecting an intersection of the plural number of white lines in the captured image; and
- a coordinate compensating block that compensates the second coordinate based the position of the infinite point.

12. A vehicle detection apparatus for detecting vehicles traveling on a road with their lights turned on, comprising:
- an image capturing block that captures images on a road;
- a light spot detecting block that detects a light spot from an image captured by the image capturing block;
- a first distance calculating block that calculates a distance to the light spot based on a horizontal length of the light spot in the captured image;
- a second distance calculating block that detects a vertical coordinate of the light spot in the captured image and for calculating a distance to the light spot based on correlated data in which vertical coordinates and distances in a captured image are correlated to each other in advance;
- a pitching amount calculating block that calculates a pitching amount that indicates a difference between the distances calculated by the first and second distance calculating blocks; and
- a vehicle light spot determining block that determines whether or not the light spot originates from a vehicle, based on the pitching amount.

13. The vehicle detection apparatus according to claim 12, wherein the light spot detected by the light spot detecting block is a horizontally located pair of light spots in the image captured by the image capturing block and
- the first distance calculating block is adapted to calculate a distance to the pair of light spots in the captured image, based on a spacing between the pair of light spots.

14. A light control apparatus loaded on a vehicle, for switching headlamps of the vehicle between high and low beams, comprising:
- a vehicle detection apparatus for detecting vehicles traveling on a road with their lights turned on; and
- light controlling means for switching the headlamps to a low beam when a vehicle is detected by the vehicle detecting means and for switching the headlamps to a high beam when no vehicle is detected by the vehicle detecting means,
- wherein the vehicle detection apparatus comprising:
- an image capturing block that captures images of a road;
- a light spot detecting block that detects a light spot from an image captured by the image capturing block;
- a first coordinate detecting block that detects a first coordinate that indicates a vertical coordinate of the light spot in the captured image;
- a distance calculating block that calculates a distance to the light spot based on a horizontal length of the light spot in the captured image;
- a second coordinate detecting block that detects a second coordinate that indicates a vertical coordinate corresponding to the distance calculated by the distance calculating block, based on correlated data in which vertical coordinates and distances in a captured image are correlated to each other in advance;
- a pitching amount calculating block that calculates a pitching amount that indicates a difference between the first coordinate and the second coordinate in the captured image; and
- a vehicle light spot determining block that determines whether or not the light spot originates from a light spot of a vehicle, based on the pitching amount.

15. The light control apparatus according to claim 14, wherein
- the light spot detecting block detects a pair of horizontally located light spots as the light spot;
- the distance calculating block calculates a distance to the pair of light spots constituting the light spot in the captured image, based on a spacing between the pair of light spots; and
- the vehicle light spot determining block determines whether or not the pair of light spots originates from a vehicle, based on the pitching amount.

16. The light control apparatus according to claim 14, further comprising:
- a ground position estimating block that estimates a ground coordinate that indicates a coordinate of a road surface ground position of a vehicle, when a light spot is assumed to originate from the vehicle, based on the horizontal length of the light spot or the spacing between a pair of light spots constituting the of light spot, which light spot is detected by the light spot detecting block, and based on the first coordinate, wherein
- the pitching amount calculating block calculates, as the pitching amount, a difference in vertical direction between the ground coordinate and the second coordinate.

17. The light control apparatus according to claim 14, further comprising:
- a storage that stores a position and a pitching amount of a vehicle into memory means in case the light spot has been determined by the vehicle light spot determining block as originating from the vehicle; and
- a reference pitching amount setting block that sets a reference pitching amount based on the position and the pitching amount stored in the storage, wherein
- the vehicle light spot determining block determines the light spot as originating from a vehicle in case the pitching amount calculated by the pitching amount calculating block falls within a predetermined specified range set in advance based on the reference pitching amount which is set by the reference pitching amount setting block.

18. The light control apparatus according to claim 14, comprising:
- a white-line detecting block that detects a plural number of white lines on a road, which white lines are parallel to a direction in which the road extends in the captured image;
- an infinite-point detecting block that detects a position of an infinite point in the captured image by detecting an intersection of the plural number of white lines in the captured image; and
- a coordinate compensating block that compensates the second coordinate based the position of the infinite point.

* * * * *